United States Patent
Hughes

(10) Patent No.: US 7,358,691 B2
(45) Date of Patent: Apr. 15, 2008

(54) VIBRATION DEVICE

(75) Inventor: Colin Jonathan Hughes, London (GB)

(73) Assignee: Sony Computer Entertainment Inc., Tokyo (JP)

( * ) Notice: Subject to any disclaimer, the term of this patent is extended or adjusted under 35 U.S.C. 154(b) by 12 days.

(21) Appl. No.: 11/429,404

(22) Filed: May 5, 2006

(65) Prior Publication Data

US 2006/0284578 A1 Dec. 21, 2006

(30) Foreign Application Priority Data

May 9, 2005 (GB) .................................. 0509421.4

(51) Int. Cl.
*H02K 33/00* (2006.01)
(52) U.S. Cl. .................... 318/114; 318/119; 318/538
(58) Field of Classification Search ............. 318/114, 318/119, 538; 369/266; 166/177; 310/81, 310/15, 12, 29, 71, 36, 40
See application file for complete search history.

(56) References Cited

U.S. PATENT DOCUMENTS

| | | | |
|---|---|---|---|
| 4,058,163 A * | 11/1977 | Yandell | 166/177.6 |
| 5,327,035 A | 7/1994 | Sunaga | |
| 5,373,207 A | 12/1994 | Yamaguchi et al. | |
| 6,486,579 B1 | 11/2002 | Furuya et al. | |
| 2002/0195891 A1 | 12/2002 | Miyasaka | |

FOREIGN PATENT DOCUMENTS

| | | |
|---|---|---|
| BE | 675208 | 5/1966 |
| DE | 31 42 819 | 5/1983 |
| EP | 0 288 343 | 10/1988 |
| EP | 1 035 633 | 9/2000 |
| FR | 1.235.461 | 5/1960 |
| JP | 11-168856 | 6/1999 |
| JP | 2004-274846 | 9/2004 |

OTHER PUBLICATIONS

International Search Report and Written Opinion dated Aug. 21, 2006 from corresponding International Application No. PCT/GB2006/001636.
Great Britain Search Report dated Jul. 27, 2005, from corresponding Great Britain Application GB0509421.4.

* cited by examiner

*Primary Examiner*—Karen Masih
(74) *Attorney, Agent, or Firm*—Katten Muchin Rosenman LLP

(57) ABSTRACT

A vibration device comprises a motor having a stator and a rotor each having one or more magnetic elements. A magnetic element on at least one of the rotor and the stator comprises an electromagnet which can be supplied with an electric current so as to interact with a magnetic element on the other of the rotor and the stator to cause rotation of the rotor with respect to the stator; and the one or more magnetic elements of the rotor, considered together, have a center of mass which is offset from the axis of rotation of the rotor. The rotor and the stator are arranged in, or together form, a cavity containing a liquid.

8 Claims, 5 Drawing Sheets

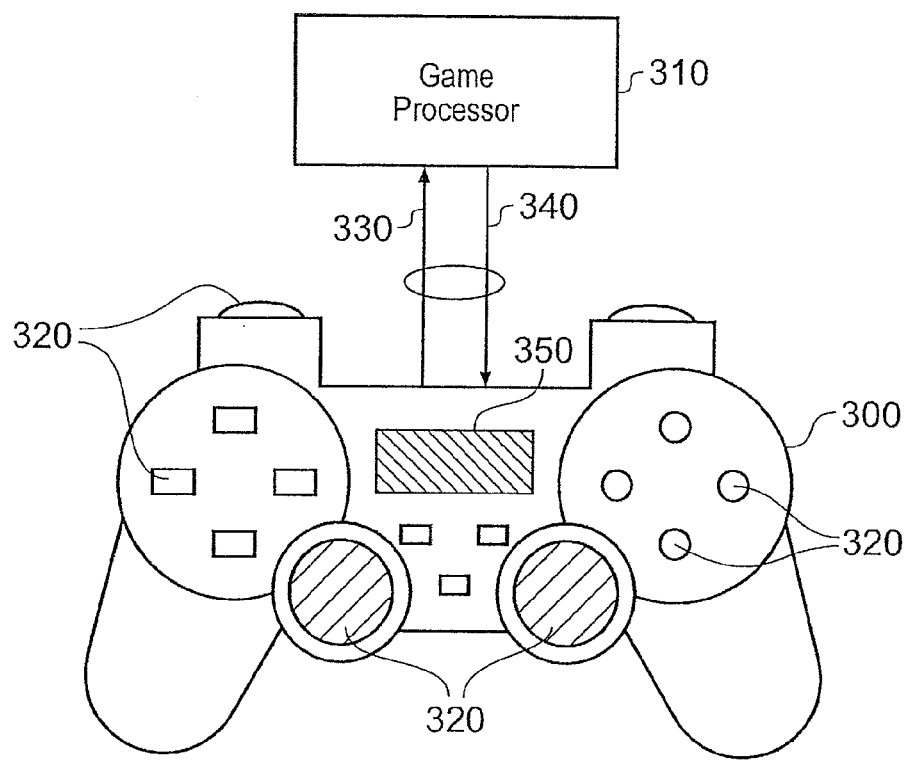
Fig. 8
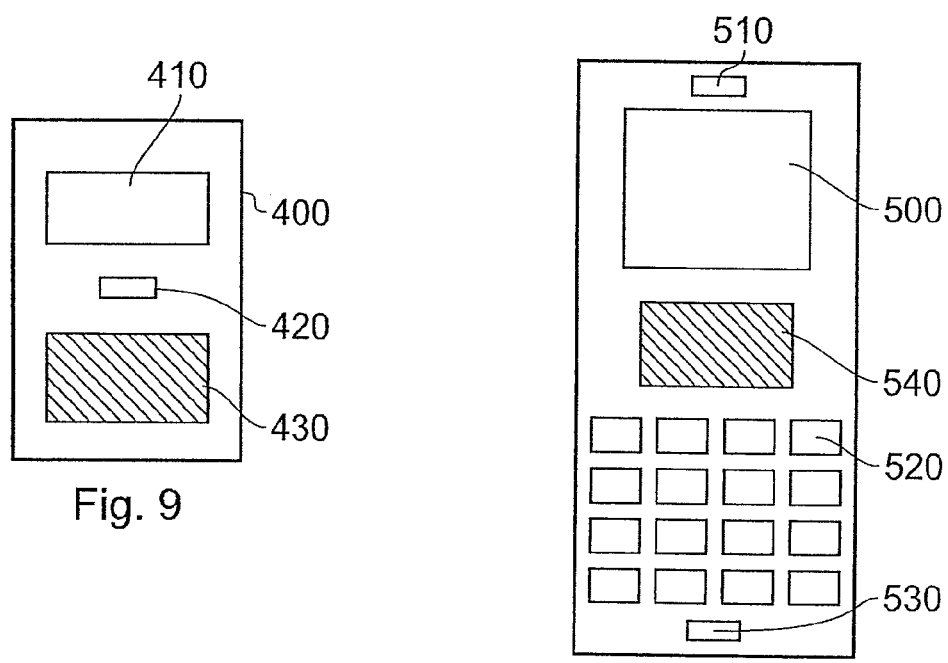
Fig. 9
Fig. 10

VIBRATION DEVICE

BACKGROUND OF THE INVENTION

1. Field of the Invention

This invention relates to vibration devices.

2. Description of the Prior Art

Vibration devices are used in applications such as pagers or mobile telephones (for "silent" call alerts and the like) and in computer game hand-held controllers (to give tactile feedback to the game player).

One type of previously proposed vibration device comprises a conventional rotary motor driving an eccentric mass or cam or the like, having its centre of mass displaced away from the axis of rotation. As the motor drives the offset mass around, a vibration is transmitted to the casing or other member to which the motor is attached.

Another previously proposed vibration device comprises a solenoid with a moveable mass (e.g. connected to a metal core within the solenoid) influenced by the magnetic field of the solenoid. The solenoid is fed with an appropriately alternating supply current so that the moveable mass is caused to oscillate and thereby to generate a vibration.

There is a constant need for vibration devices to be smaller and lighter, particularly in respect of mobile telephone applications.

SUMMARY OF THE INVENTION

This invention provides a vibration device comprising a motor having a stator and a rotor each having one or more magnetic elements, in which:

a magnetic element on at least one of the rotor and the stator comprises an electromagnet which can be supplied with an electric current so as to interact with a magnetic element on the other of the rotor and the stator to cause rotation of the rotor with respect to the stator;

the one or more magnetic elements of the rotor, considered together, have a centre of mass which is offset from the axis of rotation of the rotor; and the rotor and the stator are arranged in, or together form, a cavity containing a liquid.

Embodiments of the invention can address the need for a smaller and lighter vibration device by using the magnetic elements (permanent magnets, electrically-energised magnets or a combination of both) of the motor itself as the offset or eccentric mass which causes vibration. Thus, the need for additional masses is avoided.

The invention is applicable to devices in which the rotor is arranged to rotate inside the stator or to devices in which the rotor is arranged to rotate at least partially outside of the stator.

Preferably the device comprises two or more rotationally displaced electromagnets; and a drive circuit arranged to supply respective drive currents to the electromagnets so that the rotational displacement of the electromagnets and the relative timing of the respective drive currents tends to promote rotation of the rotor with respect to the stator. In this arrangement, the drive circuit can cause the motor to move with a stepped or jerky movement, providing an enhanced vibration effect.

The rotor and the stator are arranged in, or together form, a cavity containing a liquid such as an oil. This has various potential advantages. For example, the liquid can help to transfer vibrational motion from the rotor to the casing; the liquid can provide lubrication; and/or the liquid can cause the motor to stop more quickly when a drive current is removed.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 8 schematically illustrates a game controller;

FIG. 9 schematically illustrates a pager; and

FIG. 10 schematically illustrates a mobile telephone.

DESCRIPTION OF THE PREFERRED EMBODIMENTS

Figure 1:
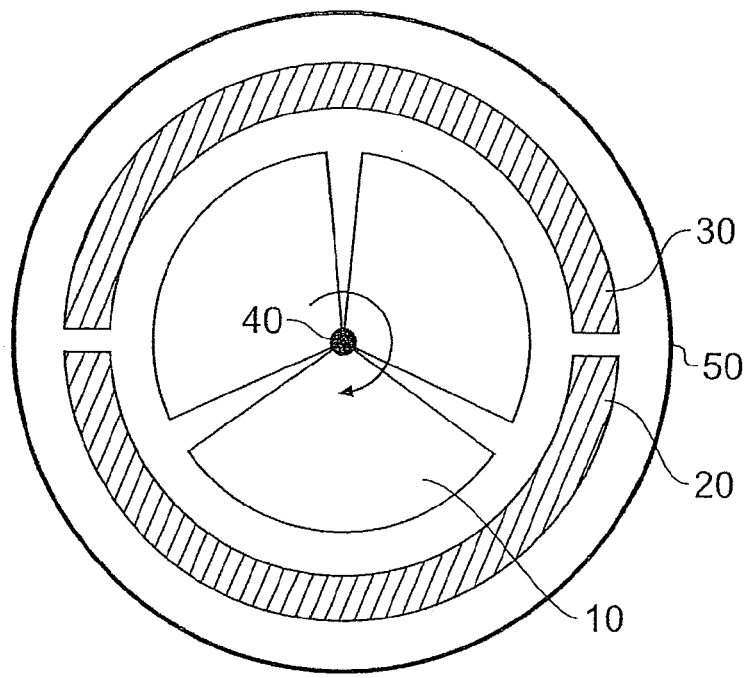
FIG. 1 schematically illustrates an electric motor having a rotor disposed inside a stator.

Referring now to the drawings, FIG. 1 schematically illustrates an electric motor having a rotor 10 disposed inside a stator 20, 30.

The rotor in this example is formed of 3 electrical windings which are arranged to rotate about an axle, the view of FIG. 1 being of course a cross-section in a plane perpendicular to the axle.

The stator is formed of magnetic elements 20, 30 which generate a magnetic field which interacts with the fields generated by the coil windings 10. The motor is encased in a housing 50.

The operation of a simple electric motor of this type is well known and is thoroughly described elsewhere, but in brief summary an electric current is supplied selectively to the coil windings 10 via, for example, a commutator and associated brushes, so that the polarity of the supply current to each winding changes as the motor rotates. Magnetic fields generated by the coil windings 10 interact with magnetic fields provided by the stator 20, 30 to generate a rotational motion about the axle 40.

The stator can be formed of permanent magnets, electromagnets or a combination of these.

Figure 2:
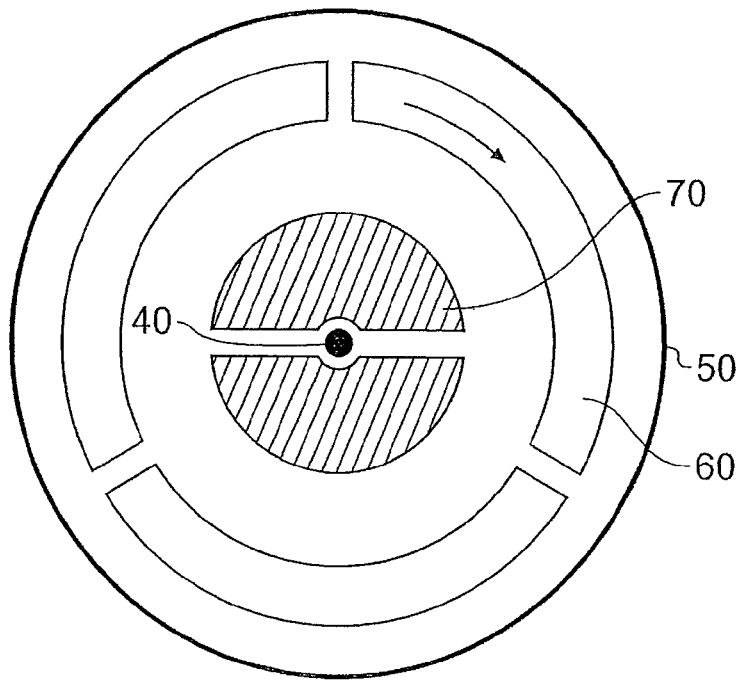
FIG. 2 schematically illustrates at electric motor having a rotor disposed around a stator.

FIG. 2 schematically illustrates another simple electric motor having a rotor 60 disposed about a stator 70. In this case the stator 70 may be formed of permanent or electrically-energised magnets which are stationary with respect to the casing 50. Similarly, the rotor 60 may be formed of permanent or electromagnets which are energised with appropriate polarities to cause a rotational motion around the axe 40.

Very many different configurations of electric motors are known. While it is possible to use permanent magnets in an electric motor, it is noted that at least some of the magnetic elements need to be electromagnets, i.e. as part of the rotor, the stator or both.

The motors described with reference to FIGS. 1 and 2 are previously proposed designs. They have in common the feature that the centre of mass of the rotor is coincident or substantially coincident with the axle 40. This is considered to be a desirable feature of such a motor to provide reduced-vibration operation.

In contrast, motors will now be described in accordance with embodiments of the present invention, where the aim is to provide enhanced-vibration operation. Indeed, in many instances, the sole use or purpose of these motors is to generate vibration.

Figure 3:
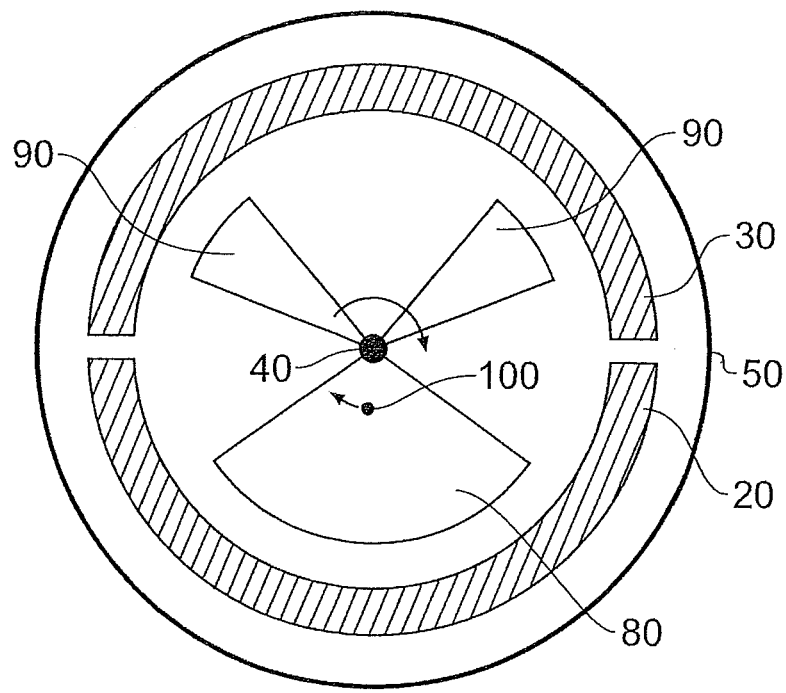
FIGS. 3 and 4 schematically illustrate electric motors having asymmetric rotors.

FIG. 3 illustrates a motor similar in operation to the motor of FIG. 1, but with an asymmetric rotor. In particular, the rotor is formed of one large section 80 and two smaller sections 90, which co-operate to give a centre of mass which is displaced away from the axe 40, being for example at a notional position 100.

In FIG. 3, the angular displacement of the centres of the magnets forming the sections 80, 90 remain at 120° to provide a reliable operation of the motor. However, as the motor rotates, the displaced centre of mass causes the whole arrangement to vibrate.

Figure 4:
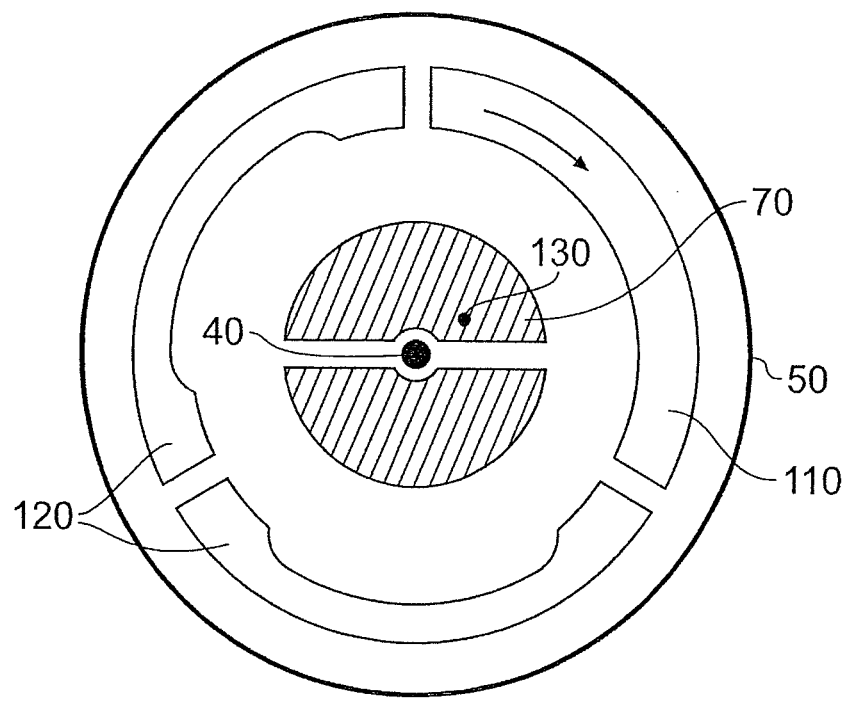

Similarly, FIG. 4 schematically illustrates a motor similar to FIG. 2 except that the rotor is formed of two lighter segments 120 and one heavier segment 110, again giving a displaced centre of mass (e.g. at a notional position 130 in the motor's current orientation). Again, as the motor rotates, the displaced centre of mass will rotate, causing a general vibration of the whole arrangement.

In other embodiments, the size of each of the rotor sections is substantially the same, but the sections have different masses, for example by being fabricated at least in part from different materials.

In the motors of FIGS. 3 and 4 (and indeed in the motors to be described subsequently) the casing 50 is wholly or partially filled with a liquid such as an oil. Preferably the liquid is not electrically conducting so as not to inhibit the operation of any electrical connections such as brushes. The liquid can assist in lubrication of the motor, in damping the motor when power is removed and in transferring the vibration or motion from the rotor to the casing 50.

The casing could be implemented, at least in part, by some of the magnetic elements themselves. For example, in FIG. 3, at least a part of the casing could be formed by the stator elements 20, 30, for example with a non-magnetic but liquid-tight material occupying the circumferential gap between the stator elements.

The examples described so far are motors with brushes. A brushless motor arrangement will now be described by way of a further example. The drawings shown in FIGS. 5A to 5D schematically illustrate the operation of such a brushless motor. Again, they are schematic cross-sections along a plane perpendicular to the motor axle. For clarify a casing containing the liquid referred to above is not shown, although to provide an embodiment of the invention one could be provided or could be formed (at least in part) by the outside of the stator.

Figure 5A:
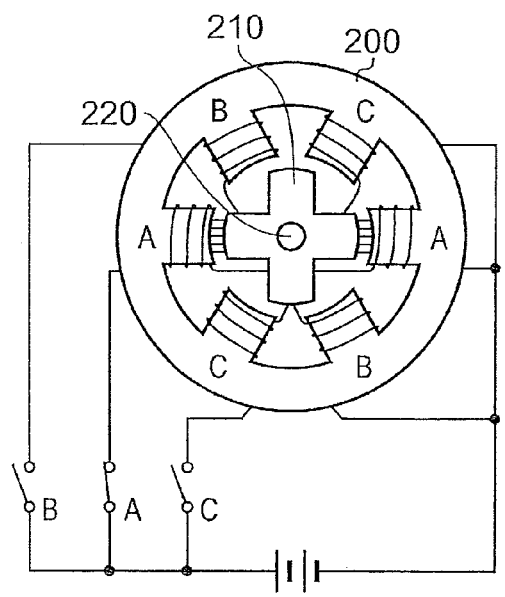
FIGS. 5A to 5D schematically illustrate the operation of a brushless motor.
Figure 5B:
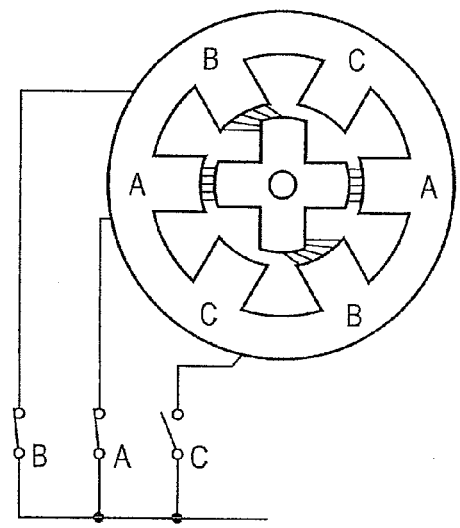
Figure 5C:
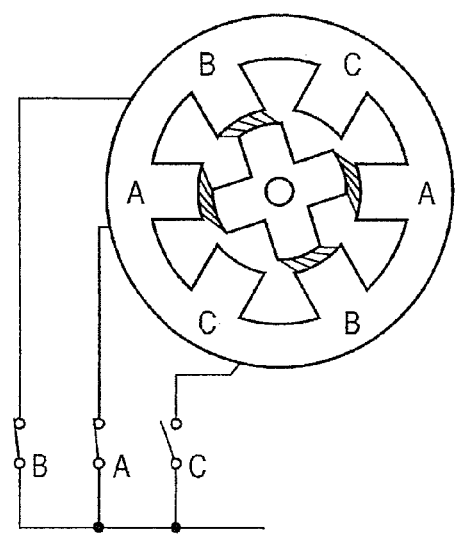

Turning to FIG. 5A, the stator is shown as an outer structure 200 having 6 poles or "teeth". These are arranged in pairs and are labelled as A, B, and C. Inside the stator is a soft steel rotor 210 which rotates about an axle 220. The rotor has four poles.

As mentioned above, the windings around the stator poles are arranged in pairs A, B and C. Each pair has two coils connected in series. Such a set of windings is called a "phase", so the example shown in FIG. 5A is a three-phase motor. Electric current is provided to the phases via respective switches, which are labelled A, B and C to correspond to the labelling of the phases.

In FIGS. 5A to 5D, for clarity the rotor is shown as having a symmetric structure. In accordance with embodiments of the invention, an asymmetric structure is used, and examples of such structures will be shown below with reference to FIGS. 7A to 7C.

Figure 5D:
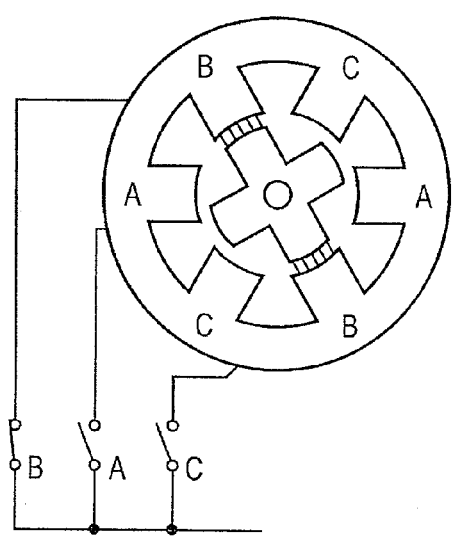

Starting with FIG. 5A, then, phase A is energised and two of the four rotor teeth are aligned with stator teeth for phase A. Next, in FIG. 5B, the switch for phase B is closed and attraction between the teeth corresponding to phase B causes a counter-clockwise torque to act on the rotor. Looking at FIG. 5C, this leads to a rotation of the rotor in a counter-clockwise direction. Referring to FIG. 5D, the current supply to the teeth for phase A is removed and the rotor aligns with the teeth for phase B. The process then repeats with phase C being energised and phase B being released and so on.

Figure 6:
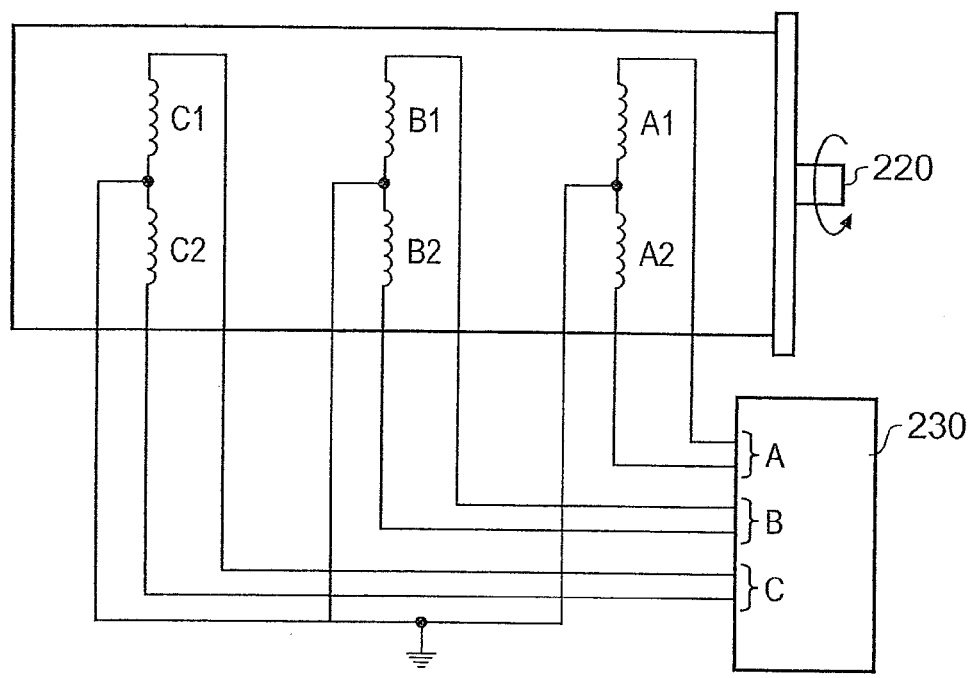
FIG. 6 schematically illustrates electrical connections to a brushless motor.

FIG. 6 schematically illustrates electrical connections to the motor of FIGS. 5A to 5D. The pairs of coils for each phase are labelled as A1, A2 etc. and current is supplied from a driver circuit 230, often implemented as a single integrated circuit device.

In a "normal" operation, the driver circuit would drive the respective coils in an appropriate order and frequency to provide substantially constant speed operation. If, however, the driver circuit applies a different time interval between the energising of the different phases of the motor, a rougher or "jerky" mode of operation can be achieved. In conjunction with the asymmetric rotors to be described below, this can give an enhanced vibrational effect.

Figure 7A:
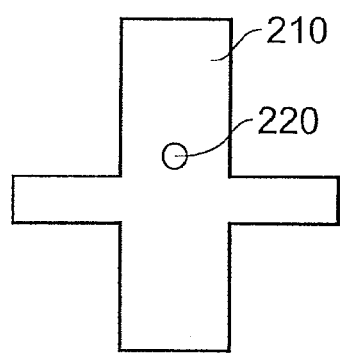
FIGS. 7A to 7C schematically illustrate rotors for a brushless motor.
Figure 7B:
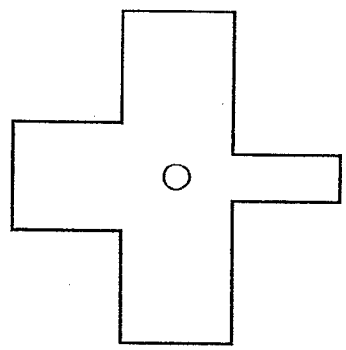
Figure 7C:
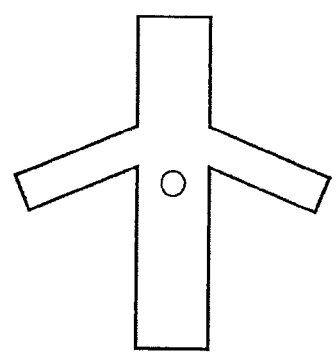

FIGS. 7A to 7C schematically illustrate motors for a brushless motor of the type described above. The rotors are shown in cross section about the axle 220 and may be formed, for example, of soft steel. It can be seen that the centre of mass of each of the rotors is displaced away from the axle, thus leading to a degree of vibration when the rotor is rotated. In other embodiments the general cross section of the rotor is uniform, but at least some of the teeth on the rotor extend along the axle for different distances to give the offset centre of mass.

Finally, some examples of the use of a motor of the type described above will now be given. FIG. 8, schematically illustrates a game controller 300 associated with a family computer entertainment system (such as a Sony®™ PlayStation 2™ family computer entertainment system) 310. Various controls 320 on the game controller generate control signals which are passed via control lines 330 to the games processor 310 and control the operation of the particular game in use. At appropriate times in the games operation, signals are sent via control lines 240 to a vibration device 350 within the handheld controller. This causes the vibration device 350 to vibrate, giving an enhanced sensation for the user.

FIG. 9, schematically illustrates a pager 400 having a message screen 410, an audible warning device 420 and a vibration device 430. When the pager is set in a so-called "silent" mode, the audible warning device 420 is switched off and only the vibration device 430 is used to notify the user that a message has arrived. Similarly, FIG. 10 schematically illustrates a mobile telephone having a display screen 500, an earpiece and audible warning device 510, a keyboard 520 and a microphone 530. For use in a "silent" mode a vibration device 540 which may be of the type described above is provided so that the user is notified only by the vibration (and perhaps a flashing light) when a call or message is received.

Although illustrative embodiments of the invention have been described in detail herein with reference to the accompanying drawings, it is to be understood that the invention is not limited to those precise embodiments, and that various changes and modifications can be effected therein by one skilled in the art without departing from the spirit and scope of the invention as defined by the appended claims.

I claim:

1. A vibration device comprising a motor having a stator and a rotor each having one or more magnetic elements, in which:
   a magnetic element on at least one of said rotor and said stator comprises an electromagnet which can be supplied with an electric current so as to interact with a magnetic element on the other of said rotor and said stator to cause rotation of said rotor with respect to said stator;
   said one or more magnetic elements of the rotor, considered together, have a centre of mass which is offset from an axis of rotation of said rotor; and
   said rotor and said stator are arranged in, or together form, a cavity containing a liquid.

2. A device according to claim 1, in which said rotor is arranged to rotate inside said stator.

3. A device according to claim 1, in which said rotor is arranged to rotate at least partially outside of the stator.

4. A device according to claim 1, comprising:
   two or more rotationally displaced electromagnets; and
   a drive circuit arranged to supply respective drive currents to said electromagnets so that the rotational displacement of the electromagnets and the relative timing of the respective drive currents tends to promote rotation of said rotor with respect to said stator.

5. A device according to claim 1, in which said liquid is oil.

6. A mobile communications device comprising a vibration device according to claim 1.

7. A game controller comprising a vibration device according to claim 1.

8. A device according to claim 4, in which the drive circuit applies a different time interval between energizing different phases of the motor.

* * * * *